United States Patent [19]

Fong

[11] Patent Number: 5,177,332
[45] Date of Patent: Jan. 5, 1993

[54] MICROWAVE ENERGY SUSCEPTIBLE CONFORMABLE LAMINATE PACKAGING MATERIALS

[75] Inventor: Dan S. C. Fong, Wilmington, Del.

[73] Assignee: E. I. Du Pont de Nemours and Company, Wilmington, Del.

[21] Appl. No.: 604,683

[22] Filed: Oct. 29, 1990

Related U.S. Application Data

[63] Continuation-in-part of Ser. No. 188,556, Apr. 29, 1988.

[51] Int. Cl.⁵ .................. H05B 6/64; B65D 81/34; B32B 15/08
[52] U.S. Cl. .................. 219/10.55 E; 219/10.55 F; 426/107; 426/113; 426/234; 426/243; 428/332
[58] Field of Search .................. 219/10.55 E, 10.55 F; 99/451, DIG. 14; 428/35.2, 35.3, 35.9, 458, 461, 332; 426/106, 107, 110, 113, 234, 241

[56] References Cited

U.S. PATENT DOCUMENTS

| | | | |
|---|---|---|---|
| 3,040,966 | 6/1962 | Crane | 383/103 |
| 4,015,085 | 3/1977 | Woods | 219/10.55 E |
| 4,190,757 | 2/1980 | Turpin et al. | 219/10.55 E |
| 4,267,420 | 5/1981 | Brastad | 219/10.55 E |
| 4,268,738 | 5/1981 | Flautt, Jr. et al. | 219/10.55 F |
| 4,316,070 | 2/1982 | Prosise et al. | 219/10.55 E |
| 4,434,197 | 8/1982 | Petriello et al. | 219/10.55 E |
| 4,553,010 | 11/1985 | Bohrer et al. | 219/10.55 E |
| 4,641,005 | 2/1987 | Seiferth | 219/10.55 E |
| 4,713,510 | 12/1987 | Quick et al. | 219/10.55 E |
| 4,797,523 | 1/1989 | Kohrer | 426/243 |
| 4,835,352 | 5/1989 | Sasaki et al. | 219/10.55 E |
| 4,848,931 | 7/1989 | Kamada et al. | 219/10.55 E |
| 4,933,193 | 6/1990 | Fisher | 426/107 |
| 4,962,000 | 10/1990 | Emslander et al. | 428/461 |

FOREIGN PATENT DOCUMENTS

58372/86 6/1985 Australia.

*Primary Examiner*—Bruce A. Reynolds
*Assistant Examiner*—Tuan Vinh To

[57] ABSTRACT

A laminated wrap for packaging articles of food requiring browning and crispening and a degree of shielding during microwave cooking is disclosed. The wrap comprises a layer of flexible, heat resistant, microwave transparent plastic film, a layer of flexible, heat resistant, heat stable, microwave transparent film, and a layer of substantially continuous microwave susceptor material located on an interior surface of a film of the laminate.

22 Claims, 5 Drawing Sheets

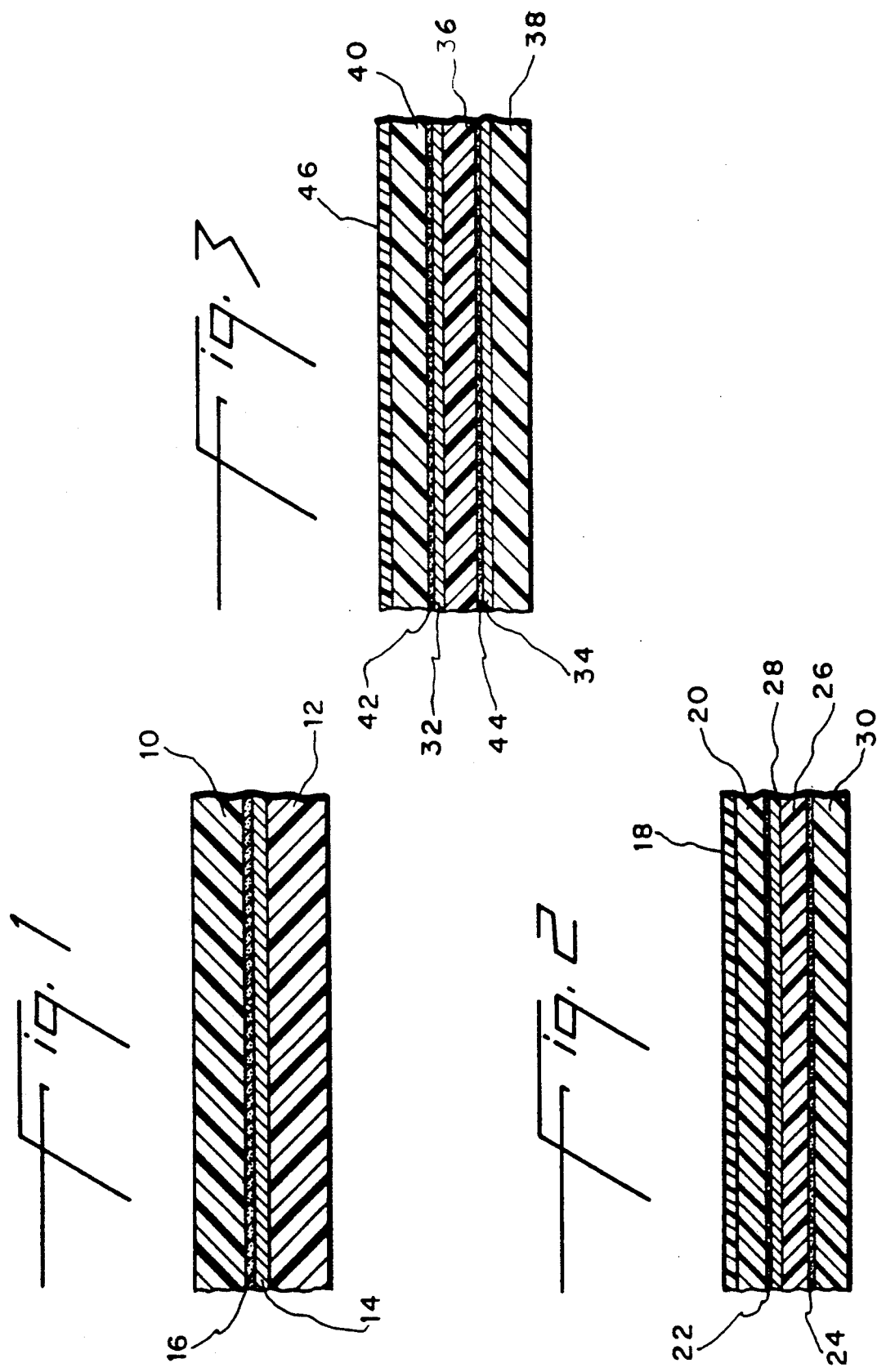

MICROWAVE ENERGY SUSCEPTIBLE CONFORMABLE LAMINATE PACKAGING MATERIALS

BACKGROUND OF THE INVENTION

This application is a continuation-in-part of U.S. application Ser. No. 07/188,556, filed Apr. 29, 1988, the disclosure of which is incorporated herein by reference.

This invention relates to packaging materials and structures used in microwave cooking, and specifically to microwaveable packaging of food items which require surface browning and/or crispening during cooking.

There has been much interest recently in packaging materials which aid in browning and crispening of food items in a microwave oven. U.S. Pat. No. 4,267,420, Brastad, discloses a food item wrapped with plastic film having a very thin coating thereon. An additional sheet or film of plastic is optionally laminated to the coating for abrasion protection. Other exterior support by more rigid dielectric materials such as paperboard and the like is also disclosed. The coating converts some of the microwave energy into heat which is transmitted directly to the surface portion of the food so that a browning and/or crispening is achieved.

U.S. Pat. No. 4,641,005, Seiferth, discloses a disposable food receptacle for use in microwave cooking, which includes a provision to brown the exterior of the food in the receptacle. A thin layer of an electrically conductive material is incorporated into the receptacle on the food contacting surfaces thereof, so that the conductive layer will become heated by the microwave radiation and will, in turn, brown the exterior of the food in the receptacle. The receptacle includes a smooth surfaced plastic film, as a protective layer, and a support means formed of paper stock material.

U.S. Pat. No. 4,713,510, Quick et al., discloses a microwave ovenable package including a layer of material that will convert a portion of the microwave energy to heat and a layer of paperboard interposed between the energy-converting layer and the food. The energy-converting layer may be carried on a plastic film, and an additional layer of paperboard may be used to sandwich the energy-converting layer and the plastic film between layers of paperboard. For the purpose of providing a more intense heating effect, two energy-converting layers, each on a dielectric substrate, sandwiched together between layers of paperboard, are disclosed.

Laminates of plastic films with thick layers of vacuum deposited metal are also known as packaging materials. For Example, U.S. Pat. No. 4,559,266, Misasa et al., discloses a laminated material comprising (A) a layer composed mainly of polyolefin, (B) a layer composed mainly of, e.g., polyester resin, (C), a metal-vacuum deposited layer, and (D) a layer composed mainly of a transparent thermoplastic resin. This laminated material is used for its superior gas barrier properties and light shielding properties, etc. Such laminates, in order to provide significant gas barrier properties for packaging applications, require deposition of metal (typically aluminum) in sufficient amounts to impart optical densities of greater than 1.0, typically at least 4.0. Such materials are substantially opaque and have light shielding properties, but are not suited for use for microwave heating applications, for which much lower optical densities are required.

In order to properly brown or crispen foods which are irregular in shape or which have nonplanar surfaces, it is desirable to have a packaging material which is readily conformable to the food. It is also desirable that the material supply enough heat energy to the surface of the food, and provide some degree of microwave shielding for the interior of the food so that the surface can be properly browned or crispened in a short time without the interior becoming overcooked. The present invention provides a laminar film which conforms closely to the shape of a food item during cooking, provides a high degree of heat to the surface of the food, and provides shielding to the interior portion.

SUMMARY OF THE INVENTION

The present invention provides a conformable multilayer laminated structure useful for packaging food for microwave cooking, comprising:
(a) at least one layer of flexible, microwave transparent plastic film able to withstand a temperature of about 220° C. without melting or degrading;
(b) at least one layer of flexible microwave transparent plastic film able to withstand a temperature of about 220° C. without melting or degrading, which film further exhibits at most about 2% shrinkage when exposed for 30 minutes to a temperature of 150° C.; and
(c) at least one layer of substantially continuous microwave susceptor material located on a surface of a film of the laminate, said layer being located between film (a) on one side and film (b) on the other side, and being present in sufficient thickness to cause the multilayer structure to heat under microwave cooking conditions to a temperature suitable for browning or crispening of food placed adjacent thereto.

The present invention also provides packages suitable for containing food and browning or crispening of the surface of food in a microwave oven prepared from such film.

BRIEF DESCRIPTION OF THE FIGURES

FIG. 1 shows a cross sectional detail of a laminated structure of this invention.

FIG. 2 shows a cross sectional detail of another laminated structure of this invention.

FIG. 3 shows an alternative embodiment which includes two layers of susceptor material.

DETAILED DESCRIPTION OF THE INVENTION

Figure 4:
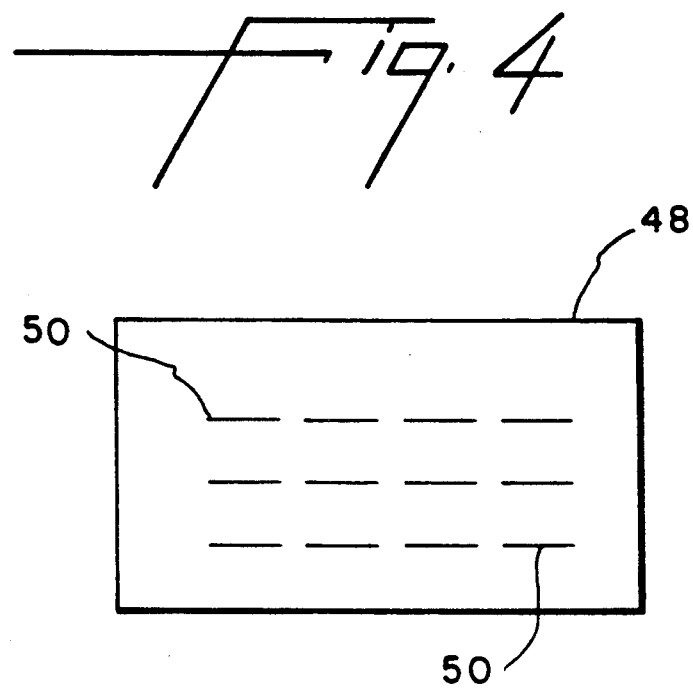
FIG. 4 shows an embodiment of the multilayered structure of this invention containing a plurality of slits.

The present invention consists of a multilayered structure having at least two layers of heat resistant microwave transparent plastic film, and at least one substantially continuous layer of microwave susceptive material. This microwave susceptive material is coated on at least one of the interior surfaces or interfaces formed between the plastic films of the laminate.

The susceptor material is a substantially continuous electrically conductive material which is present in sufficient thickness to cause the multilayer structure to heat under microwave cooking conditions to a temperature suitable for browning or crispening of food placed adjacent thereto, but not so thick as to completely prevent penetration of microwave energy to the interior of the food. The term "substantially continuous" is meant to refer to materials which exhibit measurable conductivity, typically having a surface resistance in a range of 200–2000 ohms/square. This is in contrast to materials in which the susceptor is particulate matter in the form of e.g. flakes, which may be dispersed in an insulating matrix. Such materials typically exhibit a surface resistance of at least 10,000 ohms/square and often in excess of $10^5$, $10^6$, or even $10^8$ ohms/square. A preferred susceptor material is vacuum metallized aluminum, which will preferably be present in sufficient amounts to impart an optical density of about 0.10 to about 0.35, preferably 0.16 to about 0.22, to the film. Stainless steel having a surface resistivity of about 200 to about 2000 ohms/square is also preferred. Other metals, of course, may be used, including gold, silver, mu-metal, nickel, antimony, copper, molybdenum, bronze, iron, tin, and zinc. Although the optical density may vary with the metal used, the test to determine the correct amount of coating is whether the coating will heat to the proper temperature and provide sufficient heat flux for browning or crispening of food items. The required temperature may depend on the particular food item used, but for many applications, it is at least about 180° C. The thin layer of susceptor material is preferably imparted to the film surface before lamination by vacuum metallizing. Other methods may also be used if they provide a substantially continuous layer of the desired thickness.

The layer of susceptor material is coated onto at least one surface of heat resistant, microwave transparent plastic film. This film may be made from any suitable plastic film which has the desired properties of heat resistance and microwave transparency. The term "heat resistant" refers to the ability of the film to withstand the temperatures generated in a 700 watt microwave oven during cooking without melting or degrading. When the film is made into the laminate of the present invention, as will be shown, temperatures of up to about 220° C. or more may be encountered under microwave cooking conditions, so the film should maintain its integrity at such temperatures. Thus a heat-stable film may be defined as one which does not melt or degrade when exposed to temperatures of about 200° C.; preferred films will similarly not melt or degrade when exposed to temperatures of 230° C., 260° C., or even higher. Certain polyesters, such as polyethylene terephthalate (PET), having a melting point of about 260° C., are particularly suitable for this purpose. Other suitable materials may include certain types of polyesters, polyamides, cellophane, cellulose triacetate, ethylene chlorotrifluoroethylene copolymers, fluorinated polyethylene, polyimides, polysulfones, polyvinyl alcohol polymers, polyetheretherketones, polytetrafluoroethylene, and others.

The layer of film on which the thin layer of microwave susceptor is located should have at least a moderate degree of resistance to deformation or shrinkage upon heating. Ordinary PET film (as opposed to shrink film) is suitable for use as this layer because it shrinks only about 1.5 to 3% at 150° C. over a period of thirty minutes. However, ordinary PET by itself does tend to shrink more than this amount under the intense heat encountered in a microwave oven when the film is coated with susceptor material. Excessive shrinkage observed under such conditions, of up to 60%, is not desirable because many foods, such as breads, can be crushed by the action of a such a film. Furthermore, excessive shrinkage tends to disrupt continuity of the layer of susceptor material, thereby degrading the heating properties.

In order to provide a controlled amount of shrinkage, this invention provides that at least one layer of film in the laminate should be a heat stable film. The term "heat stable" refers to film which exhibits only a minimal amount of shrinkage at elevated temperatures. For example, heat stabilized PET typically shrinks less than 0.6% in thirty minutes at 150° C. This is in contrast to ordinary PET film which, as indicated above, shrinks about 1.5 to about 3% under such conditions. Thus heat stabilized PET may be defined as PET which is treated so as to shrink less than about 2% when heated to 150° C. for thirty minutes. Preferably it will shrink less than about 1.5% or 1% when so heated, and most preferably about 0.6% or less. Heat stabilized PET is made from a regular grade of PET film by a stabilization process involving a series of heat treatment and relaxation steps, and is well known to those skilled in the art. A heat stabilization process for PET is more fully described in Bulletin E-50542, "Thermal Stabilization of Mylar ®," from E. I. Du Pont de Nemours and Company. Heat stable films, of course, may include films other than heat stabilized PET, including those listed above, provided such films have the desirable properties of minimal shrinkage under microwave cooking conditions.

One other such heat stable film which is particularly useful in the present invention is cellophane. Cellophane is a non-fibrous, material derived from cellulose. It does not melt even at temperatures well in excess of 260° C., although at such high temperatures some yellowing may occur. The shrinkage of cellophane at high temperatures is also minimal and is believed to be due to evolution of absorbed water. Thus it is known that plain, uncoated cellophane in a dry state (7% moisture), upon further heating, may shrink about 0.4–0.7% in the machine direction and about 0.1–0.3% in the transverse direction. Commercial grades of cellophane, however, often contain glycerine or propylene glycol as a softener, and such materials may result in additional retention of water, particularly when the film has been equilibrated in a humid environment. In such cases the shrinkage of a film of cellophane upon heating is somewhat greater. When the moisture level in a cellophane film is reduced from that characteristic of 35% relative humidity to that characteristic of 5% relative humidity, the resulting shrinkage is about 1–1.25% in the machine direction and about 0.7 to 1.0% in the transverse direction. Starting from a higher relative humidity would result in a somewhat larger shrinkage, e.g, from 60% R. H. the shrinkages would be about double the above numbers. Thus the characteristic shrinkage of cellophane upon heating, for purposes of the present invention, is defined as that measured on a film in its dry state, i.e., containing about 7% moisture or less.

In its simplest form, the invention contemplates use of a single layer of heat stable film in combination with a single layer of ordinary heat resistant film. These layers provide not only a support or substrate for the susceptor but also serve to protect the layer of susceptor and to provide a heat sink to prevent overheating of the film. The laminate results in improved dimensional stability and improved heating characteristics of the laminate, as described below. The thickness of the layer or layers of the heat stable film is not precisely limited. However, the thickness of the heat stable film should be sufficient to impart a degree of dimensional stability to the laminate. It is desired for the reasons discussed above that the shrinkage of the laminate, in any direction, be limited and controlled, preferably no greater than about 20 percent upon exposure to the energy of a microwave oven. It is more preferred that the shrinkage obtained will be no greater than about 15 percent, and a shrinkage of about 10 percent is most desirable. It has been found that for laminates comprising a single layer of PET, 0.013 mm thick, a single layer of heat stabilized PET about 0.013 mm thick is adequate to provide this limited degree of shrinkage. It is preferred, however, that at least two layers of heat stable film be used, one layer on either side of the thin layer of microwave susceptor material.

Laminates prepared using heat stabilized PET provide superior results compared with known laminates in which the outer layers are paper or paperboard. Laminates with paperboard do not generally exhibit the improved heating properties found in the present invention, and are not conformable, transparent, or particularly flexible.

Other layers may be present in the laminate for particular purposes. For example, the susceptor layer can be deposited on a layer of ordinary PET film, which in turn is laminated between two layers of heat stabilized PET, one on either side of the layer of ordinary (heat resistant) PET. In addition, one or more adhesive layers may be used to bond the layers of the laminate together. The adhesive may be any known to those skilled in the art to be suitable for such purposes. For some applications the adhesive layer is preferably a thin layer of an ethylene/carboxylic acid copolymer, which may, if desired, be crosslinked after formation of the multiple layer structure, by ionizing radiation. This feature is described in more detail in copending U.S. application 07/388,923, filed Aug. 3, 1989, the disclosure of which is incorporated herein by reference. In addition, one or more layers of a heat sealable thermoplastic resin may be used as surface layers, overlying the heat stable plastic layers. Such layers may be useful for sealing the film to itself or to other items, for packaging applications. Suitable heat sealable thermoplastic resins are known in the art; particularly suitable resins are polyesters selected from the group consisting of copolymers of ethylene glycol, terephthalic acid, and azelaic acid; copolymers of ethylene glycol, terephthalic acid, and isophthalic acid; and mixtures of these copolymers.

FIG. 1 shows a simple embodiment of a laminate of this invention. There are two layers of flexible, heat resistant, microwave transparent film, 10 and 12, at least one of which is heat stable film. A layer of susceptor material, 14, such as vacuum metallized aluminum, is located on an interior surface of film 12. There is also an adhesive layer, 16, used to join the layers of film together in the laminate.

FIG. 2 shows an alternative embodiment of this invention. The top layer, 18, is a layer of heat sealable resin, which overlies a layer of flexible, heat resistant, microwave transparent plastic film, 20. Layers 22 and 24 are adhesive resins. Under the first layer of plastic film 20 is a central layer of film, 26, with a coating of susceptor material, 28. Laminated to the other surface of the central film is another outer layer of plastic film 30. Either film layer 20 or 30, or preferably both, are heat stable. The central layer, 26, may also be of heat stable film, if desired, although this is not required.

FIG. 3 shows another embodiment, in which there are two internal susceptor layers, 32 and 34, located on two adjacent layers of plastic film, 36 and 38. The layers of plastic film which carry the susceptor material are laminated front to back, so that the susceptor layers are separated by the thickness of one layer of plastic film. The upper layer of susceptor material is protected by an outer layer of plastic film 40 which overlies it. The layers of film are held together by adhesive layers 42 and 44. The upper layer of film, furthermore, is overlain by a layer of heat sealable resin, 46. At least one layer 36, 38, or 40 is heat stable film, and preferably at least the two outer layers, 38 and 40 are heat stable film. The embodiment illustrated by this figure provides additional heating ability, and also additional microwave shielding, compared with that of FIG. 2, because of the additional layer of susceptor material. The presence of multiple layers of susceptor material results in an increased optical density, when the susceptor material is, for example, aluminum. The heating ability of such multiple layer heaters is improved somewhat when the layers of susceptor material are separated from each other as shown, i.e., when the films on which they are carried are not laminated together face to face. It is also permissible, therefore, when multiple layers of susceptor material are used, that one layer be located on each of the two surfaces of the central layer of plastic film. Alternatively, the susceptor material may be on the interior surfaces of the outer layers of film. In such arrangements both layers of susceptor material are covered by an outer layer of film and remain separated by the thickness of the central layer of film. It is apparent that many similar arrangements of film and susceptor layers are permissible within the scope of this invention.

The multilayer laminates of this invention have several advantages over monolayer metallized films. The first advantage is that these laminates provide a significantly higher heat flux than do the single layer, susceptor coated films. This is important because heat flux is a measure of the ability of the laminate to rapidly heat the surface of the food with which it is in contact. The reasons for this improvement are not clearly understood. It is believed, however, that the additional layers of film provide additional support and protection during heating for the susceptor layer. This support, then, prevents "mud cracking," or breaking up of the susceptor layer into small islands upon exposure to microwave radiation. Such cracking of the susceptor layer is believed to reduce the efficiency of the heating. This improvement in heating efficiency is illustrated in the examples which follow.

Another advantage is observed when films of the present invention are used to heat food items. It has been found that the interior of food items heats somewhat more slowly when the food is wrapped in films of the present invention, compared with single layer films. Thus the films provide an added measure of shielding to the interior of the food, further aiding the cooking by preventing overcooking of the food interior while the surface is being browned and crispened.

Yet another advantage of having the susceptor layer buried between other film layers is that the cover layer protects the film from oxidation or corrosion by the air. When a thin layer of aluminum on PET film was exposed to the air for seven months, the optical density was observed to decreases from an initial value of 0.23 to 0.18. Another sample, held at 38° C. and 90% relative humidity for 14 days decreased in optical density from 0.17 to 0.15, and developed streaks, while a comparable film laminated to a film of PET remained unchanged.

One of the most significant advantages of the present invention is that the presence of at least one layer of a heat stable film such as heat stabilized PET, provides a laminate which exhibits controlled shrinkage. Although the PET used is not a shrink film, single layers of microwave susceptor films under microwave conditions shrink and degrade or form holes. Even multiple layer structures may show excessive shrinkage, of up to about 60%, under microwave conditions, if at least one heat stable film layer is not used. When heat stabilized PET is used as at least one layer, and preferably two outer layers, however, the shrinkage is controlled to about 10%. This level of shrinkage is necessary for many applications, in order to permit the film to retain a snug configuration about the item of food to be cooked. Thus packages made of the laminates of the present invention will shrink just enough to achieve or maintain conformity about the food item, without crushing it. Such behavior is particularly desirable for packaging of such fragile items as bread. The conformity with the surface of the food item permits efficient transfer of heat energy from the film to the food surface, for efficient browning or crispening of the food.

The controlled shrinkage, furthermore, results in structures which do not exhibit large scale nonuniform deterioration, such as holes, developing upon heating in a microwave oven. Such deteriorations or other distortions are observed when single layer, susceptor coated films that are not heat stable are used for wrapping foods for microwave cooking. These deteriorations prevent the film from conforming to the shape of the food, and thus prevent uniform cooking.

Figure 5:
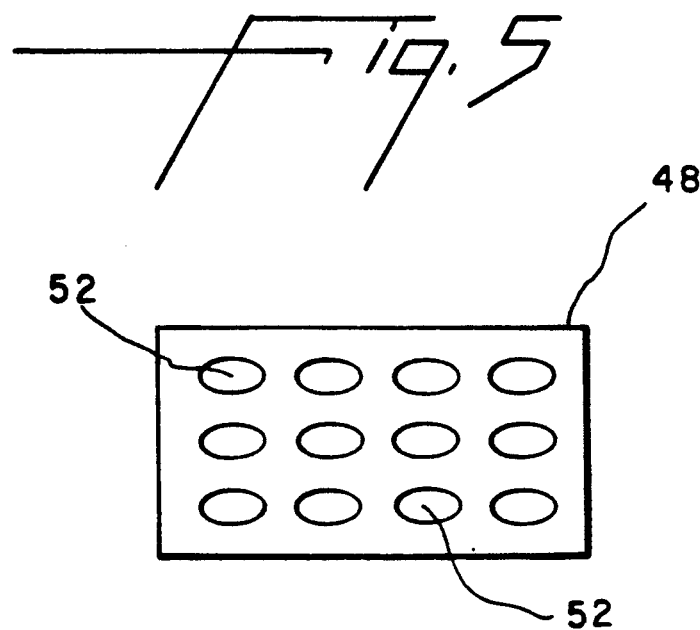
FIG. 5 shows the structure of FIG. 4 after microwave irradiation.

It is also possible to take advantage of the limited shrinkage of the laminates prepared with heat stabilized PET in a different manner. FIG. 4 shows a sheet of such film 48 containing slits 50 piercing through the thickness of the film. These slits may be covered by a label affixed by pressure sensitive adhesive (not shown) during storage, which is removed before cooking. Upon microwave treatment, the slits open to form the openings 52 shown in FIG. 5. A laminate containing one or more such openings may be useful for venting of vapor from the food item during cooking.

COMPARATIVE EXAMPLES C1–C3

Comparative Examples C1–C3, reported in Table I, show some of the properties of single layers of PET, not heat stabilized, metallized with aluminum. Films B, C, and D are films of polyethylene terephthalate, 0.013 mm thick (0.5 mils, 50 gauge) which have been vacuum metallized with aluminum to the optical density indicated.

The shrinkage of these film upon exposure to a 700 W microwave field for 10 seconds is also reported in Table I. For such measurements, A strip of film, 127 mm × 25 mm, is clamped in a holder assembly made of polytetrafluoroethylene. One end of the film is attached to a clamp rigidly mounted onto the base of the holder assembly. The other end of the film is attached to a clamp which mounted on the base. As the film heats, shrinkage of the film moves the slidably mounted clamp along a scale so that the relative amount of shrinkage can be measured by comparing the position of the clamp before and after heating. Tests are reported of samples in which the long dimension is in the machine direction as well as in the transverse direction. During such tests, these single layer films fail mechanically by formation of holes. This mechanical failure results in the anomalously low measurements of shrinkage for these single layer films, as reported in Table I. (This hole formation is suggestive that the films, without the presence of additional layers of film or contact with the surface of a food item to act as a heat sink, may heat in this test to above the melting point of the PET, which is about 250°–260° C.)

The heating parameters for the films are shown in Table I. The maximum temperature and heat flux are determined by measuring the temperature rise of a sample of oil. The oil, 5 g of microwave transparent oil (Dow-Corning 210H heat transfer silicon oil), is placed in a Pyrex ™ borosilicate glass tube, 125 mm long, 15 mm outside diameter. A sample of film to be tested, 46 × 20 mm, is wrapped around the tube, with the long dimension of the film along the length of the tube and the top edge of the film located at the level of the surface of the oil. The film sample is secured by use of microwave transparent tape prepared from polytetrafluoroethylene, about 6 mm larger than the film sample, and the tube assembly is supported in a holder also of polytetrafluoroethylene. The temperature rise of the oil upon heating the assembly in a microwave oven is measured at 15 second intervals using a "Luxtron" temperature probe placed in the oil sample and connected to suitable recording instrumentation. Maximum heat flux is taken from the plot of oil temperature versus time, and is reported as the slope of a straight line originating at time = 0 minutes and terminating at the time which gives the greatest slope, normally about 1 minute. The values so obtained are often approximately ⅝ of the maximum instantaneous increase in oil temperature as a function of time.

EXAMPLES 1–5 AND COMPARATIVE EXAMPLES C4–C13

Examples 1–5 and Comparative Examples C4–C13, in Table I, show the properties of various multiple layer laminated film structures. The structure of these films is shown schematically. One layer (B, C, or D) is a layer of polyethylene terephthalate metallized with aluminum, as in Comparative Examples C1–C3. The metallized film is laminated to at least one other layer of film, using a layer of adhesive, "Adcote" 506-40 (crosslinkable copolyester, from Morton Thiokol). After lamination the laminate is stored, rolled on a paper core for at least three days, and normally 7 to 14 days at room temperature in order to ensure complete curing of the adhesive. The substrate is either paper (parchment, 0.13 mm, 5 mils) or polyethylene terephthalate film. The PET film is indicated in the Table by the letter "H" for heat stabilized PET film, or by the letter "P" for PET film which is not heat stabilized. The thickness of the PET film substrate is about 0.012 mm or about 0.023 mm, indicated by the numbers "48" (48 gauge) or "92" (92 gauge), respectively. In some cases the PET films are also coated with a layer of heat sealable polyester resin, located on the outer surface. This heat sealable layer is the condensation product of 1.0 mol ethylene glycol with 0.53 mol terephthalic acid and 0.47 mol azelaic acid, also containing small amounts of erucamide and magnesium silicate. This layer is indicated in the Table by the plus (+) symbol. It is seen from Comparative Examples C4, C5, C9, C11, and C12 that the laminates in which the films are not heat stable tend to exhibit excessive shrinkage upon heating in a microwave oven, evidenced by excessive MD or TD shrinkage, and exhibiting significant variability among samples. When at least one film of the laminate is heat stabilized PET, however, the shrinkage is much less and much more uniform and predictable.

The laminates of the present invention, furthermore, show improved temperature and heat flux characteristics compared with the single layer films, when the susceptor layer is located in the interior of the laminate. (See Example 1 and Comparative Example C2.) When the susceptor layer is located on an outer surface of the laminate, however, there is no improvement in heat flux. (Comparative Examples C6, C7, and C8.) When paper, rather than film, is used to prepare the laminate (Comparative Examples C10 and C13) there is no significant improvement in heating properties compared with single films. It should be noted that laminates which exhibit larger heat flux would, because of the higher temperatures generated, tend to shrink more than would structures exhibiting lower heat flux, independently of the composition of the film layers. This factor should be taken into account when comparing shrinkage values.

EXAMPLE 6 AND COMPARATIVE EXAMPLES C14–C20

These examples are prepared by laminating two layers of aluminized film, as indicated. In Comparative Examples C14 and C16 the layers of metal are adjacent, separated only by a layer of adhesive. In Example 6 and Comparative Examples C15 and C17 the layers of metal are separated by the thickness of the PET layer. In the examples when two layers of susceptor coating are separated by a layer of film, further improvement in heating efficiency is seen. This result permits a film structure such as that of Example 6 to be used for the microwave cooking of certain food products, such as pizza or bread, which require a high surface heat, but where the interior of the product requires a degree of shielding to prevent overcooking.

TABLE I

| Ex | Composition | OD | % Shrink MD | % Shrink TD | Max T (°C.) | Max Flux (kcal/m²-min) |
|---|---|---|---|---|---|---|
| C1 | B* | 0.13 | 8 | 15c | | |
| C2 | C* | 0.16 | 7 | 8c | 181 | 133 |
| " | | | | | 140 | 68 |
| " | | 0.19 | | | 183 | 108 |
| " | | | | | 167 | 93 |
| " | | | | | 180 | 116 |
| " | | 0.18 | 7 | 8c | | |
| C3 | D* | 0.28 | 4 | 5c | | |
| " | | 0.23 | | | 87 | 28 |
| " | | | | | 73 | 21 |
| " | | | | | 90 | 33 |
| C4 | B*/48P+ | 0.14 | 5 | 38 | | |
| C5 | C*/48P− | 0.17 | 29 | 48 | 202 | 175 |
| C6 | *C/48P+ | 0.18 | | | 168 | 116 |
| C7 | *C/48H | 0.19 | 14 | 3 | 128 | 59 |
| " | | | | | 174 | 105 |
| 1 | C*/48H+ | 0.14 | 10 | 9 | 205 | 186 |

TABLE I-continued

| Ex | Composition | OD | % Shrink MD | % Shrink TD | Max T (°C.) | Max Flux (kcal/m²-min) |
|---|---|---|---|---|---|---|
| " | " | 0.16 | a | 7 | 188 | 160 |
| " | " | | a | a | 184 | 145 |
| C8 | *D/48H | 0.21 | 5 | 2 | 178 | 106 |
| " | " | | | | 171 | 101 |
| C9 | D*/48P+ | 0.25 | 10 | 4 | | |
| 2 | D*/48H+ | 0.19 | 8b | 4b | 193 | 160 |
| " | " | | | | 192 | 170 |
| C10 | C*/Paper | | | | 175 | 143 |
| C11 | 48P/C*/48P− | 0.15 | 55 | 60 | 212 | 200 |
| C12 | 92P/C*/48P− | 0.16 | 30 | 25 | 206 | 195 |
| 3 | 48H/C*/48H− | | 10 | 8 | 206 | 222 |
| " | " | | | | 206 | 209 |
| 4 | 48H/C*/48H+ | 0.16 | 8 | 8 | 212 | 189 |
| " | " | 0.17 | 18 | 6 | 201 | 148 |
| " | " | | | | 200 | 150 |
| 5 | 48H/D*/48H+ | 0.19 | 5 | 7 | 200 | 171 |
| " | " | | | | 191 | 140 |
| C13 | Paper/C*/Paper | | | | 161 | 115 |
| C14 | C*/*D | 0.34 | a | a | 195 | 199 |
| " | " | | | | 199 | 190 |
| C15 | C*/D* | 0.38 | a | 7 | 215 | 230 |
| " | " | | | | 213 | 221 |
| C16 | D*/*C/48P+ | 0.35 | | | 197 | 195 |
| C17 | D*/*C/48P− | 0.35 | | | 213 | 214 |
| 6 | 48H/C*/D*/48H− | 0.34 | 16 | 14 | 213 | 218 |
| " | " | | | | 213 | 217 |
| C18 | *D/92P+/*C | 0.37 | 20 | 22 | 210 | 187 |
| " | " | | | | 216 | 194 |
| C19 | *D/48P−/*C | 0.40 | 20 | 22 | 201 | 199 |
| " | " | | | | 204 | 199 |
| C20 | Paper/C*/C*/Paper | | | | 200 | 197 |

*indicates location of susceptor layer.
−: indicates location of heat sealable polyester layer.
a: sample broke.
b a duplicate measurement, believed to be in error, showed 45 and 50% for MD and TD, respectively.
c samples developed holes during test.

EXAMPLE 7

Loaves of Italian bread (454 g) were purchased from a local supermarket packaged in white paper bags. They were stored for two days, some in their original bags, and some sealed in pouches formed from composite film of similar to that of Example 4. The pouch was reasonably transparent, permitting a good view of the bread. After two days storage, the unwrapped samples were hard and stale. (See Table II.) Both the unwrapped and the wrapped samples were heated for two minutes in a 700 watt microwave oven. Only the loaves sealed in the susceptor pouches were properly restored. (Properly restored loaves have a crisp, dry crust, but an interior which is not dry, but slightly moist, and not tough.) During the microwave heating process, the pouches shrank somewhat by "microwrinkling" around the bread to give a snug fit. (Since the loaves were too long to use a turntable, browning and crisping was not completely uniform.) Internal temperatures of the loaves was measured using "Luxtron" probes, and recorded as a function of cooking time, shown in Table III.

TABLE II

| PERCENT WEIGHT LOSS | | |
|---|---|---|
| | Unwrapped | In Pouches |
| 1 day | 6 | negligible |
| 2 days | 11 | 0.2 |
| after microwave heating | 15 | 1.7 |

TABLE III

| Time | Temperature. °C. | |
|---|---|---|
| (sec) | Unwrapped | Pouch |
| 0 | 20 | 21.5 |
| 15 | 32 | 26 |
| 30 | 45 | 30.5 |
| 45 | 66 | 35 |
| 60 | 88 | 40.5 |
| 75 | 100 | 47 |
| 90 | 102 | 52.5 |
| 105 | 103 | 62 |
| 120 | 103 | 66 |

Average of two loaves heated. Deviation from the average temperature did not exceed ± 7 C°.

It is believed that the fact that the internal temperature in the wrapped sample did not quickly rise to the boiling point is important to successful reconstitution of the bread. This difference is believed to result from the shielding effect of the low microwave transmission of the film used.

EXAMPLE 8

Figure 6:
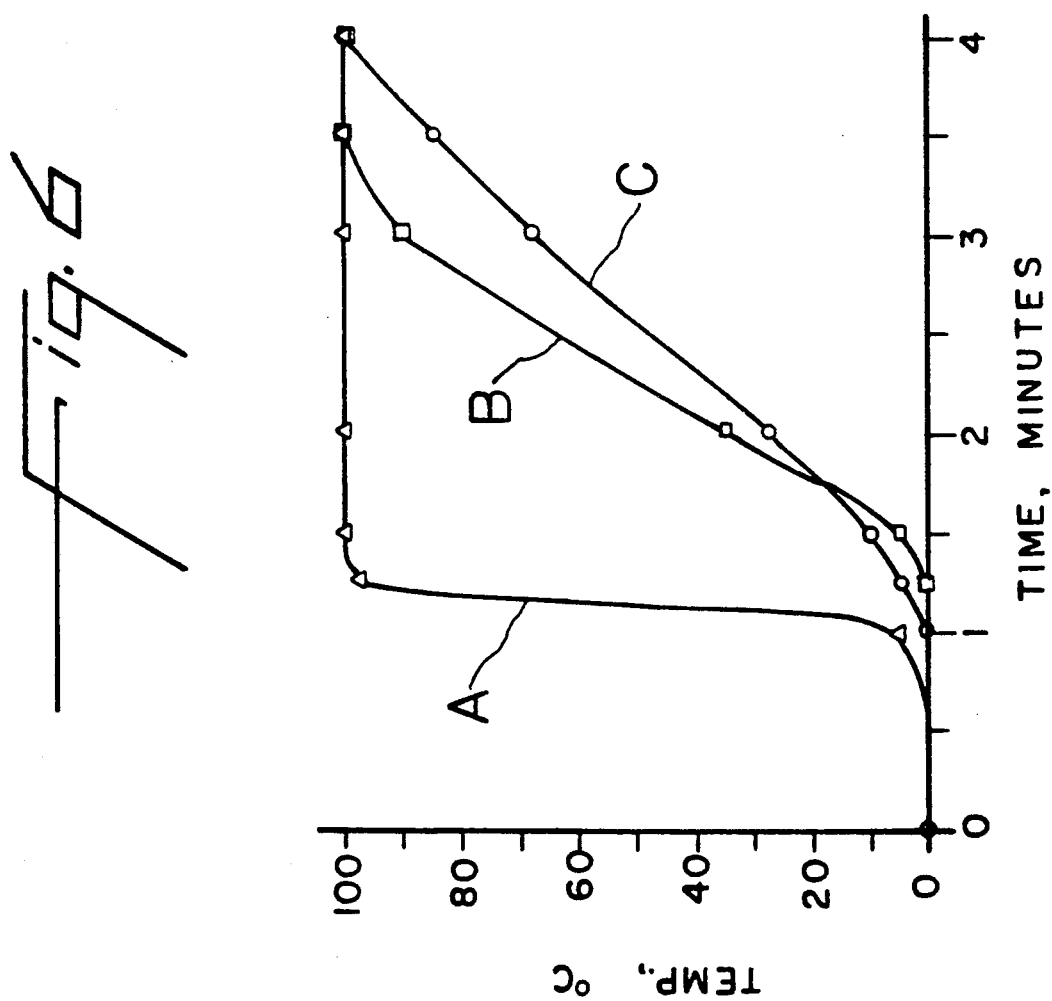
FIG. 6 and FIG. 7 show the internal heating curves for food items packaged with the structures of the present invention and with comparative packages.

Three frozen egg rolls (La Choy TM, "Almond Chicken" filling) weighing about 120 g, about 127 mm long and about 38 mm diameter were cooked in a microwave oven as in Example 7, for 4 minutes. Sample A was cooked without any susceptor wrapping. Sample B was wrapped in a single layer metallized PET having an optical density of 0.16 (film C in Comparative Example C2). The wrapping was sealed with a polyimide based tape. Sample C was wrapped and sealed with a film similar to that of Example 4. The results are shown in Table IV and FIG. 6.

TABLE IV

| Time | Temperature. °C. | | |
|---|---|---|---|
| (min) | A unwrapped | B monolayer | C laminate |
| 0.00 | 0 | 0 | 0 |
| 1.00 | 5 | 0 | 0 |
| 1.25 | 98 | 0 | 5 |
| 1.50 | 100 | 5 | 10 |
| 2.00 | 100 | 35 | 28 |
| 3.00 | 100 | 90 | 68 |
| 3.50 | 100 | 100 | 85 |
| 4.00 | 100 | 100 | 100 |

Desirable serving temperature for most hot foods is 70° C. The desired cooking period for frozen egg rolls is about 3 minutes, in order to obtain the best browning. Only the package of this invention (C) meets these requirements. Both of the other two egg rolls were overdone, the unwrapped one (A) especially so. The unwrapped egg roll, in addition, was soft and soggy on the outside. It is believed that the favorable results from package C derive in large part from reduced transmission of microwaves to the bulk of the food item and increased shielding provided by the laminate, compared with the monolayer film.

EXAMPLE 9

Figure 7:
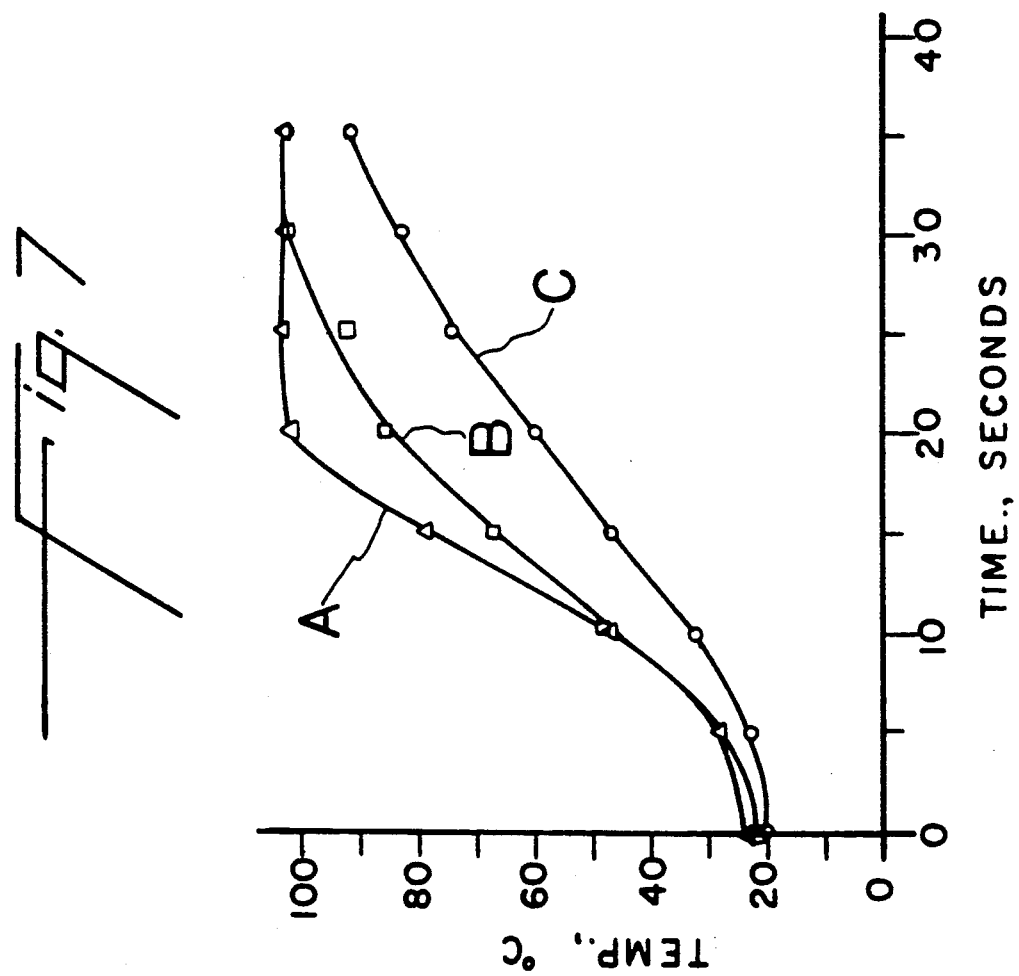

Example 8 was repeated, using instead of the egg rolls, fresh "steak" rolls. The results are shown in Table V and FIG. 7. As in Example 7, the unwrapped roll did not attain surface crispness and was internally overcooked. The results also show that the laminate of this invention (C) provide greater shielding fo the interior of the food item than does a monolayer structure (B).

TABLE V

| Time | Temperature. °C. | | |
|---|---|---|---|
| (sec) | A unwrapped | B monolayer | C laminate |
| 0 | 24 | 22 | 20 |
| 5 | 28 | 28 | 23 |
| 10 | 47 | 47 | 33 |
| 15 | 79 | 67 | 47 |
| 20 | 102 | 86 | 60 |
| 25 | 103 | 92 | 74 |
| 30 | 103 | 102 | 83 |
| 35 | 103 | 103 | 88 |

EXAMPLE 10

Two frozen dinner rolls, 150 mm long × 64 mm diameter were cooked separately in a 700 watt microwave oven. The first was cooked unwrapped, as removed from the store package, as a control. The second was sealed in a pouch of film as in Example 7. After 60 seconds of heating, the unwrapped sample was soft on the outside and steaming on the inside (about 93° C.). The wrapped sample, after 65 seconds of heating, was crispy and brown on the outside and properly hot (about 70° C.) on the inside.

EXAMPLE 11

Figure 8:
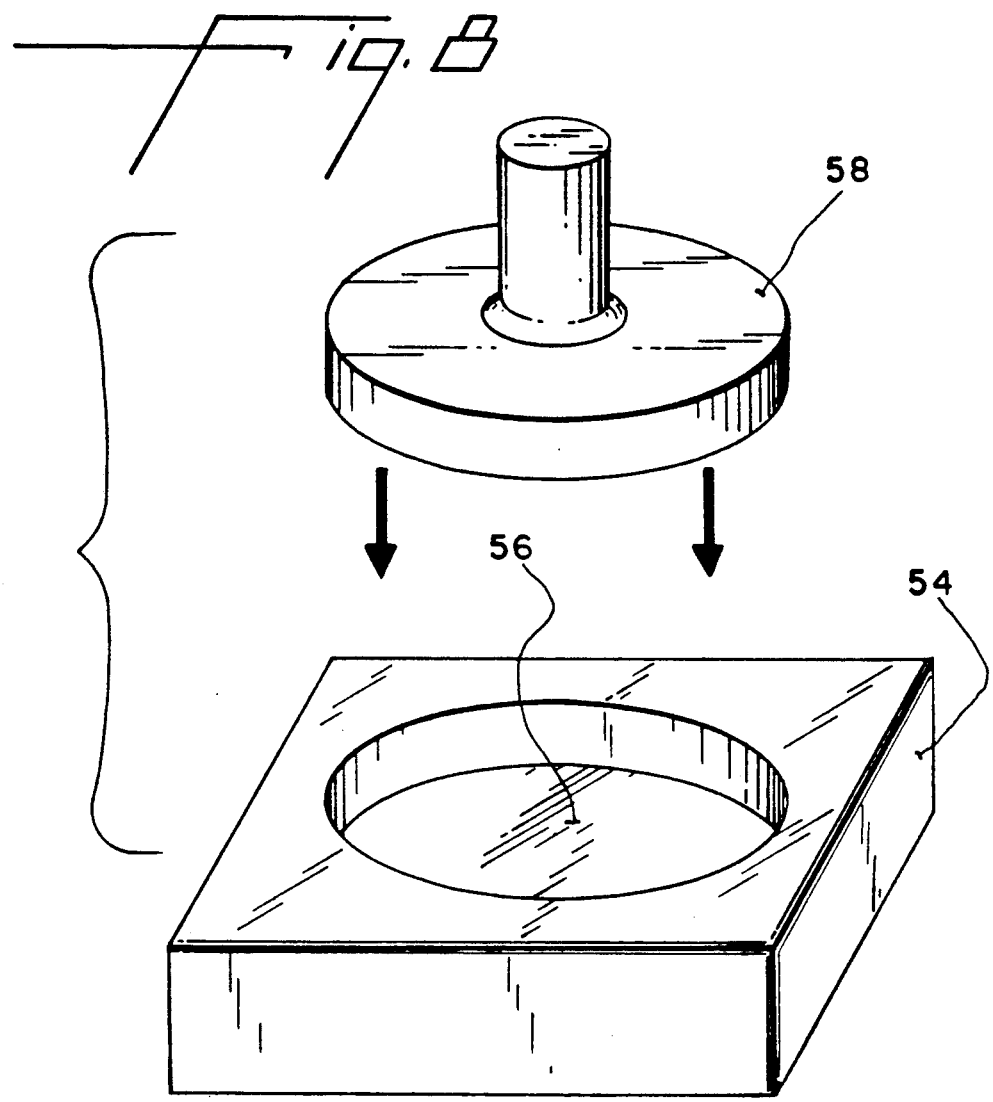
FIG. 8 shows a mold assembly suitable for conforming the laminated film of the present invention to the crust of a deep dish pizza.
Figure 9:
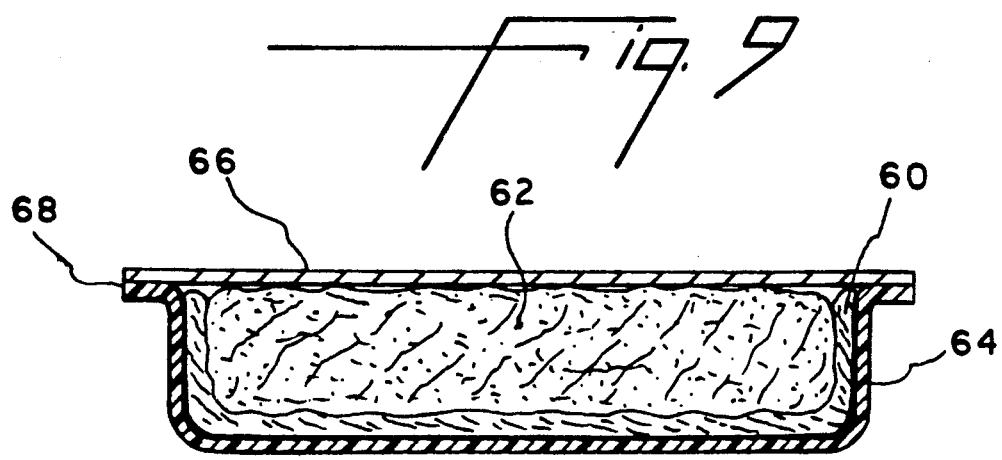
FIG. 9 shows a package of the present invention.

This example shows a packaging configuration other than a pouch. A round deep-dish pizza was packaged and cooked in a package made from the laminate of this invention. A 185 mm square piece of susceptor film as in Example 4 was conformed to the bottom and sides of the crust of the pizza by use of a mold assembly shown in FIG. 8. The mold assembly 54 contained a round cavity, 56 about 134 mm in diameter and 33 mm deep, a suitable size for containing the pizza. The film was placed over the cavity and pressed into the cavity by ram 58, so that the film conformed to the cavity, and wrinkles were pressed into place. The ram was removed and the pizza, frozen, weighing 184 g, 127 mm diameter, 25 mm height, was placed into the formed film. The excess film was trimmed even with the edges of the mold assembly. A cover sheet of 9 micrometer (35 gauge) aluminum foil laminated to 0.13 mm (5 mil) parchment paper was heat sealed to the film (by means of the heat sealable layer) to act as a shield over the top of the pizza. A diagram of the packaged pizza is shown in FIG. 9. The pizza with crust, 60, and filling, 62, is held within the laminated film, 64. The cover sheet, 66 is sealed to the lower, laminated film, 64, to form a circumferential rim, 68. The packaged pizza was removed from the mold cavity and cooked in a 700 watt oven with a turntable for 3 minutes and 45 seconds. The bottom and sides of the crust were crisp and brown, and the filling was hot but not overcooked. The crisp, stiff crust provided good shape and integrity for the pizza.

COMPARATIVE EXAMPLE C21

An identical pizza was cooked in its original open ended plastic bag under the same conditions as Example 11. No browning or crispening of the crust was apparent. The crust, rather, was wet and soggy and the topping messy. The pizza itself was floppy and had poor shape integrity.

EXAMPLES 12 and 13

Laminated samples of films having multiple layers of heat stabilized PET are prepared by the procedure described for Example 1. The heating and shrinkage results from tests on these films are presented in Table VI, wherein the designation of the layers is the same as that used in Table I. The presence of additional layers of heat stabilized PET provides additional structural stability and avoids the problem of breakage occasionally encountered when a single layer of such film is used (see Example 1).

TABLE VI

| Ex | Composition | OD[a] | % Shrink MD | % Shrink TD | Max T (°C.) | Max Flux (kcal/ m²-min) |
|---|---|---|---|---|---|---|
| 12 | C*/48H+/48H | 0.16 | 20 | 16 | 190 | 246 |
|  | " |  |  |  | 199 | 197 |
| 13 | C*/48H+/48H/48H | 0.16 | 25 | 12 | 203 | 176 |
|  | " |  |  |  | 200 | 178 |

[a]Optical density taken from the measurement of the film of Example 1, from which the present films are prepared.

COMPARATIVE EXAMPLE C22

A sample is prepared in which a layer of the film designated above as "C*" is laminated to a layer of polyethylene. The results of tests, performed as described above, are indicated in Table VII, in which 200Peth indicates a layer of polyethylene which is (in this case) 2 mils thick (200 gauge).

TABLE VII

| Ex | Composition | Max T (°C.) | Max Flux (kcal/ m²-min) | % Shrink MD | % Shrink TD |
|---|---|---|---|---|---|
| C22 | C*/200Peth | 192 | 167 | 45 | 6 (holes/ broke) |

COMPARATIVE EXAMPLES C23–C26

Samples are prepared in which a layer of the film designated above as "C*" is laminated with zero, one, or two layers of polyethylene (ordinary low density polyethylene unless otherwise indicated). The heating properties of such films are measured as described above, except that the size of the film samples is approximately 48 mm × 11 mm and the glass tube containing silicon oil is supported in a small dewar flask rather than a holder of polytetrafluoroethylene. The maximum heat flux is determined by measuring the maximum temperature rise between adjacent measurement times. This provides a maximum instantaneous value, rather than the maximum value from time=0 as described above for Comparative Example 1. The results from the heating experiments are shown in Table VII.

TABLE VII

| Ex | Composition | Max T (°C.)[a] | Max Flux (kcal/ m²-min) |
|---|---|---|---|
| C23 | C* | 124 | 130 |
|  | " | 92 | 85 |
|  | " | 134 | 164 |
| C24 | C*/200Peth | 143 | 175 |
|  | " | 151 | 192 |
| C25 | 200Peth/C*/200Peth | 142 | 141 |
|  | " | 145 | 158 |
| C26 | 200HDP/C*/200HDP[b] | 171 | 237 |
|  | " | 183 | 219 |

[a]Recorded as temperature rise, delta T; converted to Max. T by assuming a starting temperature of 30° C., believed to be accurate to within about 2°.
[b]HDP = linear, high density polyethylene, (2 mils thick)

The results from these Comparative Examples show that addition to the metallized film of one or two layers of ordinary low density polyethylene—a material which is neither heat stable nor heat resistant—results in an increase in the maximum heat flux from about 126 to about 166, or a increase of about 32%. (When high density polyethylene is used, the increase is greater.) In contrast, when one or two layers of heat stabilized PET is added to the same material ("C*") (See Examples 1, 3, and 4 and Comparative Example 2), the increase in heat flux is greater, about 69%.

What is claimed is:

1. A conformable multilayer laminated structure useful for packaging food for microwave cooking, comprising:
   (a) at least one layer of flexible, microwave transparent plastic layer to withstand a temperature of about 220° C. without melting or degrading;
   (b) at least one layer of flexible microwave transparent plastic film to withstand a temperature of about 220° C. without melting or degrading, which film further exhibits less than about 2% shrinkage when exposed for 30 minutes to a temperature of 150° C.; and
   (c) at least one layer of substantially continuous microwave susceptor material located on a surface of a film of the laminate, said layer being located between film (a) on one side and film (b) on the other side, and being present in sufficient thickness to cause the multilayer structure to heat under microwave cooking conditions to a temperature suitable for browning or crispening of food placed adjacent thereto.

2. The multilayer structure of claim 1 wherein thickness of film (b) is at least about 0.013 mm.

3. The multilayer structure of claim 1 wherein thickness of film (b) is at least about 0.025 mm.

4. The multilayer structure of claim 1 wherein films (a) and (b) are prepared from polymers selected from the group consisting of polyesters, polyamides, cellophane, cellulose triacetate, ethylene chlorotrifluoroethylene copolymers, fluorinated polyethylene, polyimides, polysulfones, polyvinyl alcohol polymers, polyetheretherketones, and polytetrafluoroethylene.

5. The multilayer structure of claim 4 wherein films (a) and (b) are prepared from polyethylene terephthalate.

6. The multilayer structure of claim 4 wherein film (a) is polyethylene terephthalate and film (b) is heat stabilized polyethylene terephthalate.

7. The multilayer structure of claim 4 wherein film (a) is polyethylene terephthalate and film (b) is cellophane.

8. The multilayer structure of claim 1 wherein the microwave susceptor material is vacuum deposited metal.

9. The multilayer structure of claim 8 wherein the metal is aluminum, present in sufficient quantity to impart an optical density of about 0.10 to about 0.35 to the structure, per each such layer of aluminum.

10. The multilayer structure of claim 9 wherein the aluminum is present in sufficient quantity to impart an optical density of about 0.16 to about 0.22 to the structure, per each such layer of aluminum.

11. The multilayer structure of claim 8 wherein the metal is stainless steel.

12. The multilayer structure of claim 11 wherein the stainless steel is present in an amount sufficient to provide a surface resistivity of about 200 to about 2000 ohms/square.

13. The multilayer structure of claim 1 further comprising at least one surface layer of heat sealable thermoplastic resin.

14. The multilayer structure of claim 1 wherein at least one slit pierces the structure.

15. The multilayer structure of claim 1 wherein film (a) exhibits at most about 1.5% shrinkage when exposed for 30 minutes to a temperature of 150° C.

16. The multilayer structure of claim 1 wherein the layer of susceptor material is located on the surface of a third flexible, microwave transparent plastic film able to withstand a temperature of 220° C. without melting or degrading, said third film being located between films (a) and (b).

17. The multilayer structure of claim 1 wherein there are a plurality of layers of substantially continuous microwave susceptor material, said layers being separated from each other by at least one layer of flexible, microwave transparent plastic film able to withstand a temperature of 220° C. without melting or degrading.

18. A package suitable for containing food and browning or crispening the surface of food in a microwave oven comprising a conformable multilayer laminated structure, which structure comprises:
   (a) at least one layer of flexible, microwave transparent plastic film able to withstand a temperature of about 220° C. without melting or degrading;
   (b) at least one layer of flexible microwave transparent plastic film able to withstand a temperature of about 220° C. without melting or degrading, which film further exhibits less than about 2% shrinkage when exposed for 30 minutes to a temperature of 150° C.; and
   (c) at least one layer of substantially continuous microwave susceptor material located on a surface of a film of the laminate, said layer being located between film (a) on one side and film (b) on the other side, and being present in sufficient thickness to cause the multilayer structure to heat under microwave cooking conditions to a temperature suitable for browning or crispening of food placed adjacent thereto.
   said structure being wrapped about the food.

19. A package suitable for containing and cooking a food item which requires browning or crispening of bottom and side surfaces and shielding of its top surface, said package comprising:
   (a) a bottom portion conformed to the bottom and side surfaces of the food item, extending to the level of the upper surface of the food item, said bottom portion comprising a conformable multilayer structure, which structure comprises:
      (i) at least one layer of flexible, microwave transparent plastic film able to withstand a temperature of about 220° C. without melting or degrading;
      (ii) at least one layer of flexible microwave transparent plastic film able to withstand a temperature of about 220° C. without melting or degrading, which film further exhibits less than about 2% shrinkage when exposed for 30 minutes to a temperature of 150° C.;
      (iii) at least one layer of substantially continuous microwave susceptor material located on a surface of a film of the laminate, said layer being located between film (i) one side and film (ii) on the other side, and being present in sufficient thickness to cause the multilayer structure to heat under microwave cooking conditions to a temperature suitable for browning or crispening of food placed adjacent thereto; and
      (iv) at least one surface layer of heat sealable thermoplastic resin; and said package further comprising
   (b) a substantially microwave reflecting cover, said cover being at least partially sealed to the bottom portion of the package, thereby forming a space to contain the food item.

20. The package of claim 19 wherein the film of the bottom portion forms a radial flange about the circumference of the food item near level of the upper surface of the food item, and the cover is sealed to the flange.

21. A conformable multilayer laminated structure useful for packaging food for microwave cooking, comprising:
   (a) at least one layer of flexible microwave transparent plastic film able to withstand a temperature of about 220° C. without melting or degrading;
   (b) at least one layer of cellophane able to withstand a temperature of about 220° C. without melting or degrading, which film further exhibits less than about 2% shrinkable when exposed for 30 minutes to a temperature of 150° C.; and
   (c) at least one layer of substantially continuous microwave susceptor material located on a film of the laminate, said layer being located between film (a) on one side and film (b) on the other side, and being present in sufficient thickness to cause the multilayer structure to heat under microwave cooking conditions to a temperature suitable for browning or crispening of food placed adjacent thereto.

22. A conformable multilayer laminated structure useful for packaging food for microwave cooking, comprising:
   (a) at least one layer of flexible, microwave transparent plastic film to withstand a temperature of about 220° C. without melting or degrading;
   (b) at least one layer of flexible microwave transparent plastic film to withstand a temperature of about 220° C. without melting or degrading, which film further exhibits sufficiently low shrinkage at microwave cooking temperatures that the resulting laminated structure shrinks at most about 20% in any dimension upon exposure to a 700 W microwave energy field for 10 seconds.
   (c) at least one layer of substantially continuous microwave susceptor material located on a surface of a film of the laminate, said layer being located between film (a) on one side and film (b) on the other side, and being present in sufficient thickness to cause the multilayer structure to heat under microwave cooking conditions to a temperature suitable for browning or crispening of food placed adjacent thereto.

* * * * *